US009623783B1

(12) United States Patent
Muller et al.

(10) Patent No.: US 9,623,783 B1
(45) Date of Patent: Apr. 18, 2017

(54) REMOTELY OPERATED STORAGE SYSTEM FOR DEPLOYABLE ROBOTS

(71) Applicant: The Boeing Company, Chicago, IL (US)

(72) Inventors: Donald W. Muller, League City, TX (US); Jeffrey L. Bertelsen, Coldspring, TX (US)

(73) Assignee: THE BOEING COMPANY, Chicago, IL (US)

( * ) Notice: Subject to any disclaimer, the term of this patent is extended or adjusted under 35 U.S.C. 154(b) by 874 days.

(21) Appl. No.: 13/658,736

(22) Filed: Oct. 23, 2012

(51) Int. Cl.
B60P 3/06 (2006.01)
B60R 9/06 (2006.01)

(52) U.S. Cl.
CPC .............. B60P 3/06 (2013.01); B60R 9/065 (2013.01)

(58) Field of Classification Search
CPC ......... B60R 9/06; B60R 9/065; B60R 9/0426; B60R 9/042; B60R 9/055; G05D 2201/0209; B60P 3/062; B60P 3/07; B60P 3/071; B60P 1/4421; B60P 1/64; B60P 1/003; B60P 1/02; B60P 1/4414; B60P 1/4442; B60P 3/06; B66F 9/07581; A61G 3/0209
See application file for complete search history.

(56) References Cited

U.S. PATENT DOCUMENTS

| 3,606,246 | A | * | 9/1971 | Harrah | 254/2 B |
| 3,651,965 | A | * | 3/1972 | Simonelli | A61G 3/061 414/537 |
| 3,795,329 | A | * | 3/1974 | Martin et al. | 414/545 |
| 3,831,788 | A | * | 8/1974 | Erlinder | 414/545 |
| 4,089,542 | A | * | 5/1978 | Westerman | 280/639 |
| 4,121,695 | A | * | 10/1978 | Carpenter | 414/539 |
| 5,137,411 | A | * | 8/1992 | Eul et al. | 414/462 |
| 5,199,842 | A | * | 4/1993 | Watt et al. | 414/537 |
| 5,395,020 | A | * | 3/1995 | King | 224/521 |
| 5,401,135 | A | * | 3/1995 | Stoen et al. | 414/546 |
| 5,597,282 | A | * | 1/1997 | Hoffman et al. | 414/545 |
| 6,769,858 | B1 | * | 8/2004 | Butler et al. | 414/462 |
| 7,083,373 | B1 | * | 8/2006 | Boudreau | 414/462 |
| 7,896,113 | B1 | * | 3/2011 | Ramirez | B25J 5/005 180/9 |
| 7,913,343 | B1 | * | 3/2011 | Cohn | 14/71.3 |
| 8,708,634 | B2 | * | 4/2014 | Mears | 414/462 |
| 2002/0088052 | A1 | * | 7/2002 | Vilsmeier | 5/133 |
| 2004/0028513 | A1 | * | 2/2004 | Reynolds | 414/546 |
| 2006/0104775 | A1 | * | 5/2006 | Kasten et al. | 414/546 |

(Continued)

Primary Examiner — Glenn Myers

(57) ABSTRACT

A remotely-operated storage and deployment system for a robotic vehicle includes a frame structure, a carrier, a lifting device, and a motor. The carrier includes a ramp moveable from a closed position in which a robotic vehicle can be enclosed in the carrier and an open position in which a robotic vehicle can drive into or out of the carrier. The lifting device is connected to the carrier and to the frame structure for moving a portion of the carrier between a raised position in which the portion of the carrier is raised relative to a ground surface and the ramp is in the closed position, and a lowered position in which the portion of the carrier is lowered relative to the ground surface and the ramp is in the open position. The motor is connected to the lifting device for allowing remote operation of the carrier.

16 Claims, 13 Drawing Sheets

(56) References Cited

U.S. PATENT DOCUMENTS

2008/0100076 A1\* 5/2008 Potts ................................. 296/3
2010/0034628 A1\* 2/2010 Ray ............................... 414/462
2010/0135756 A1\* 6/2010 Winter, IV .................... 414/462
2013/0341124 A1\* 12/2013 Robinson et al. ........... 182/63.1

\* cited by examiner

REMOTELY OPERATED STORAGE SYSTEM FOR DEPLOYABLE ROBOTS

FIELD OF THE DISCLOSURE

This disclosure relates to remotely operated storage systems for storing, deploying, and recovering robots.

BACKGROUND

Robotic vehicles, which are unmanned, exist for achieving functions which are dangerous to humans in military, police, and fire department applications, amongst others. Typically, the operator of the robotic vehicle must exit the vehicle which carries the robotic vehicle to the deployment location to set-up and deploy the robotic vehicle.

A system and method is needed to overcome one or more of the issues associated with one or more of the existing systems and methods for storing, carrying, deploying, and retrieving robotic vehicles to permit the operator to remain in the vehicle.

SUMMARY

In one embodiment, a remotely-operated storage and deployment system for a robotic vehicle includes a frame structure, a carrier, a lifting device, and a remote-controlled motor. The carrier is sized to hold and enclose a robotic vehicle. The carrier includes a ramp moveable from a closed position in which a robotic vehicle can be enclosed in the carrier and an open position in which a robotic vehicle can drive into or out of the carrier. The lifting device is connected to the carrier and to the frame structure for moving a portion of the carrier between a raised position in which the portion of the carrier is raised relative to a ground surface and the ramp is in the closed position for enclosing a robotic vehicle in the carrier, and a lowered position in which the portion of the carrier is lowered relative to the ground surface and the ramp is in the open position for allowing a robotic vehicle to drive into or out of the carrier. The remote-controlled motor is connected to the lifting device for allowing the portion of the carrier to be moved, by a remotely-located operator, between the raised position and the lowered position.

In another embodiment, a vehicle includes a remotely-operated storage and deployment system attached to the vehicle. The remotely-operated storage and deployment system includes a frame structure, a carrier, a lifting device, and a remote-controlled motor. The frame structure is attached to the vehicle. The carrier is sized to hold and enclose a robotic vehicle. The carrier includes a ramp moveable from a closed position in which a robotic vehicle can be enclosed in the carrier and an open position in which a robotic vehicle can drive into or out of the carrier. The lifting device is connected to the carrier and to the frame structure for moving a portion of the carrier between a raised position in which the portion of the carrier is raised relative to a ground surface and the ramp is in the closed position for enclosing a robotic vehicle in the carrier, and a lowered position in which the portion of the carrier is lowered relative to the ground surface and the ramp is in the open position for allowing a robotic vehicle to drive into or out of the carrier. The remote-controlled motor is connected to the lifting device for allowing the portion of the carrier to be moved, by a remotely-located operator, between the raised position and the lowered position.

In still another embodiment, a method of deploying a robotic vehicle is disclosed. In one step, a robotic vehicle is enclosed within a carrier in a raised position relative to a ground surface in which a portion of the carrier is raised relative to a ground surface and a ramp of the carrier is in a closed position preventing the robotic vehicle from coming out of the carrier. In another step, the portion of the carrier is lowered, using a remote-control, from the raised position to a lowered position relative to the ground surface in which the portion of the carrier is lowered relative to the ground surface and the ramp is in an open position allowing the robotic vehicle to drive out of the carrier. In still another step, the robotic vehicle is controlled to drive over the ramp and out of the carrier onto the ground surface while the portion of the carrier is in the lowered position.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
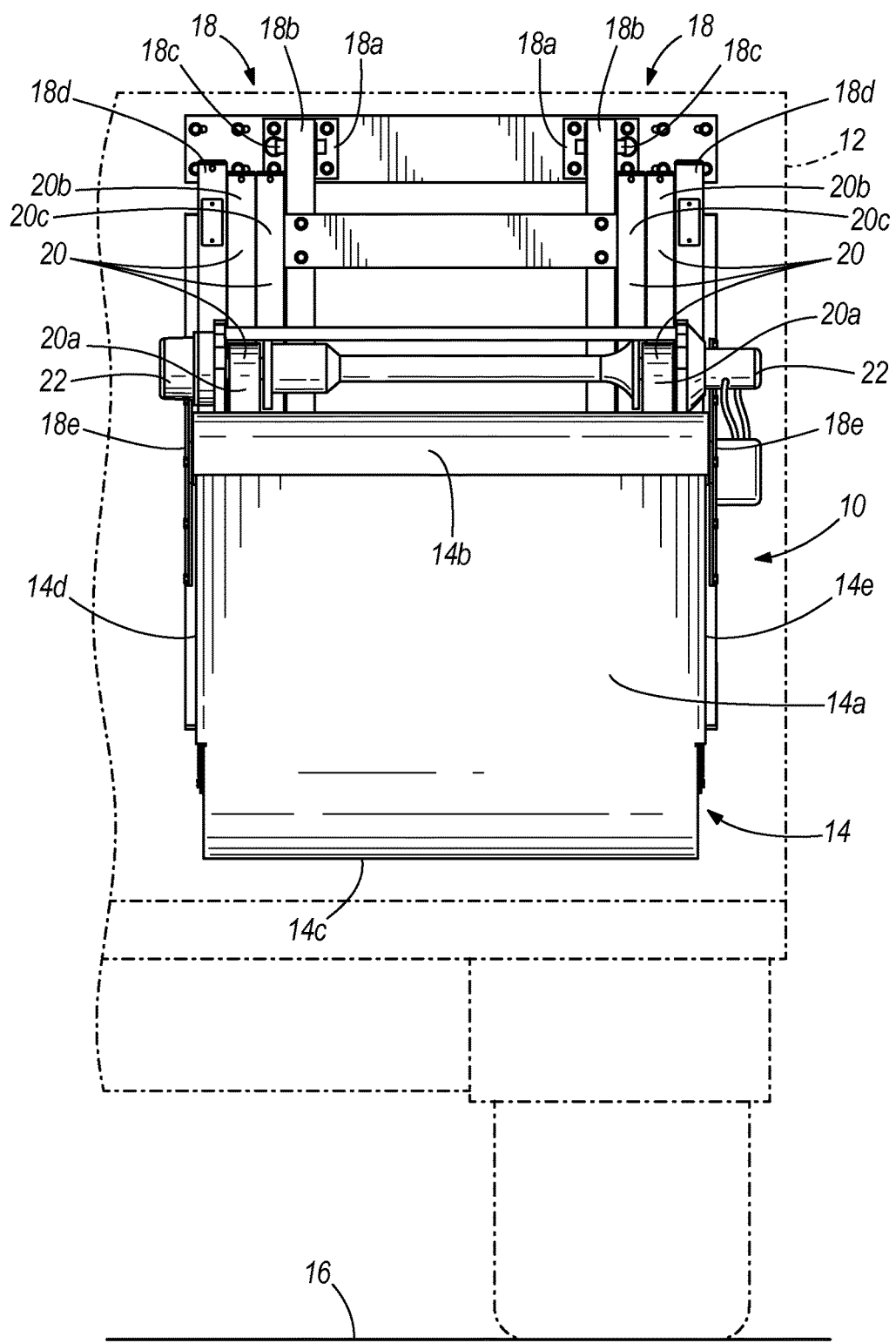
FIG. 1 illustrates a front view of one embodiment of a remotely-operated storage and deployment system, attached to a vehicle, with a carrier containing a robotic vehicle (hidden from view) in a raised position relative to a ground surface with a ramp of the carrier in a closed position holding the robotic vehicle within the carrier.
Figure 2:
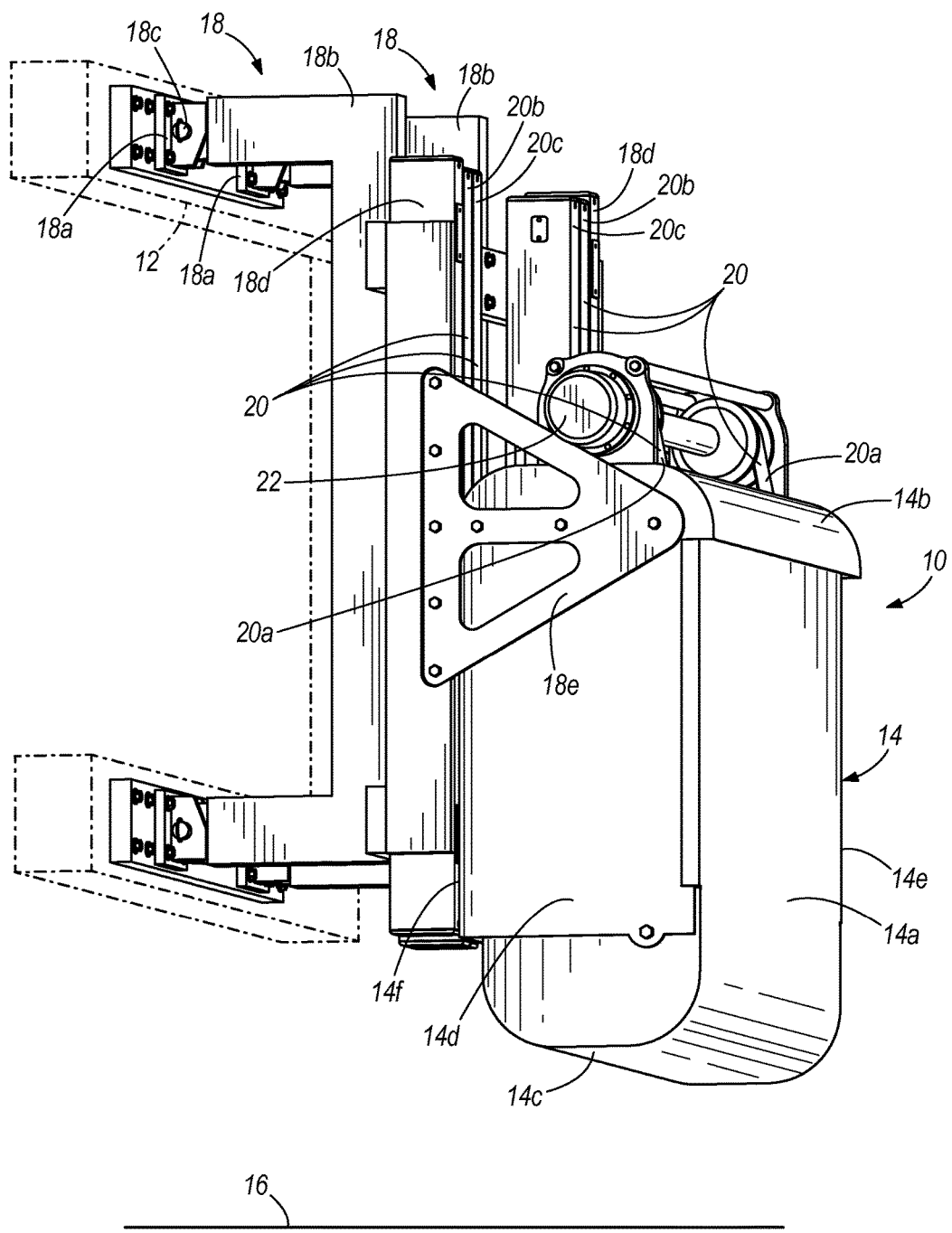
FIG. 2 illustrates a left-side view of the remotely-operated storage and deployment system attached to the vehicle of the embodiment of FIG. 1.
Figure 3:
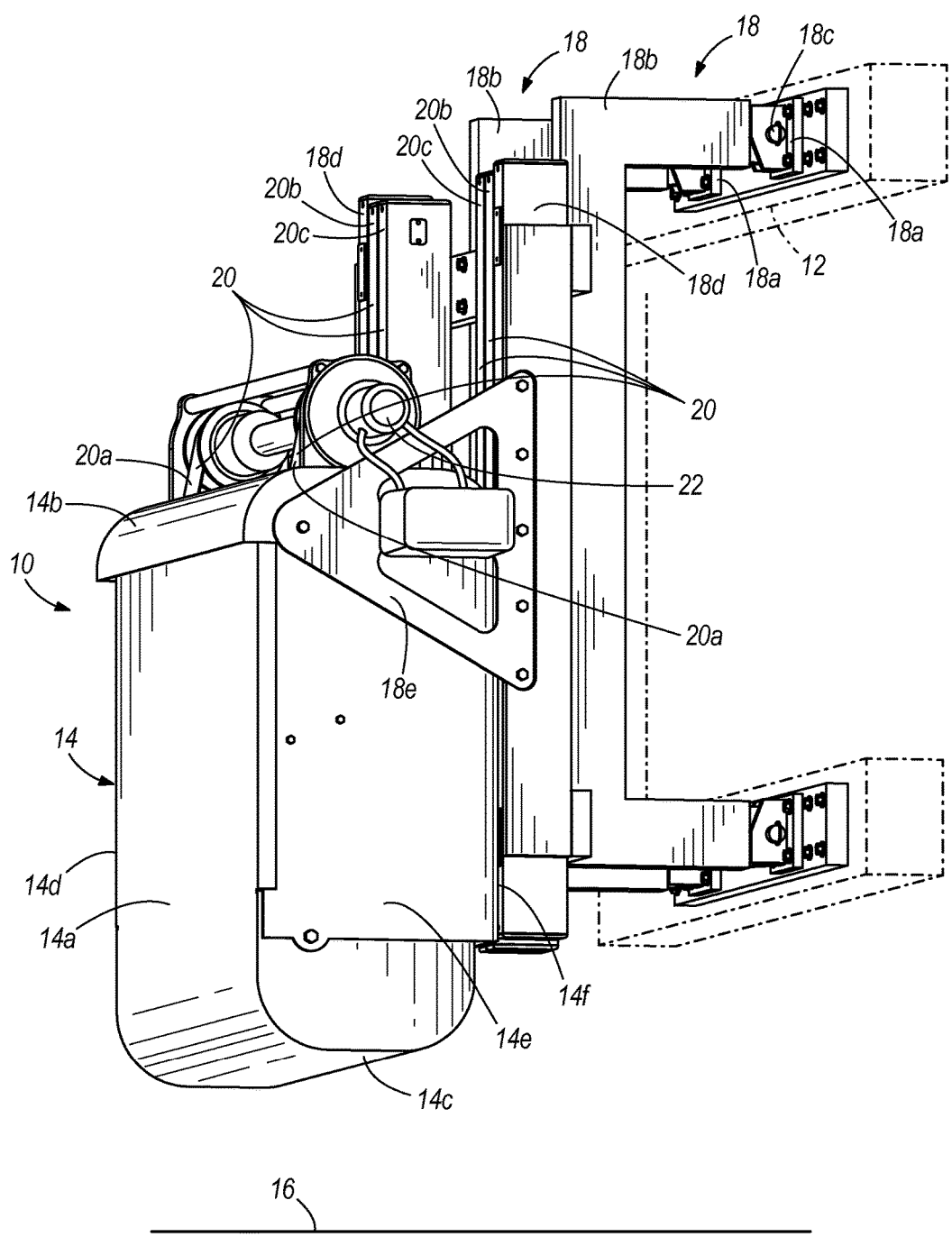
FIG. 3 illustrates a right-side view of the remotely-operated storage and deployment system attached to the vehicle of the embodiment of FIG. 1.

FIGS. 1-3 respectively illustrate front, left-side, and right-side views of one embodiment of a remotely-operated storage and deployment system 10, attached to a vehicle 12, with a carrier 14 containing a robotic vehicle (hidden from view) in a raised position relative to a ground surface 16 with a ramp 14a of the carrier 14 in a closed position holding the robotic vehicle within the carrier 14. In this position, the robotic vehicle (hidden from view) is secured for transport, fully operational, and ready to be deployed and operated. The robotic vehicle (hidden from view) comprises a robotic, unmanned vehicle. The remotely-operated storage and deployment system 10 is adapted to store, deploy, and retrieve the robotic vehicle contained within the carrier 14 with a remote operator such as an operator located within the vehicle 12 or located in a location remote from the vehicle 12. The vehicle 12 may comprise a military department vehicle, a police department vehicle, a fire department vehicle, or another type of vehicle which is used to store, deploy, and retrieve a robotic vehicle to achieve a function such as a mission dangerous to humans (such as destroying or deactivating a bomb) or another type of mission. As shown collectively in FIGS. 1-3, the remotely-operated storage and deployment system 10 comprises the carrier 14, a frame structure 18, a lifting device 20, and a motor 22.

The frame structure 18 comprises attachment brackets 18a for removeably attaching the remotely-operated storage and deployment system 10 to the vehicle 12. The attachment brackets 18a may be bolted to the vehicle 12 or attached to the vehicle 12 using other attachment mechanisms. The frame structure 18 further comprises opposed frame members 18b attached to the attachment brackets 18a with detachment members 18c. The detachment members 18c may comprise pins, latches, or other mechanisms for quickly decoupling or coupling the frame members 18b relative to the attachment bracket 18a in order remove the carrier 14, the lifting device 20, and the motor 22 from the attachment bracket 18a. In other embodiments, the attachment brackets 18a can be used to removeably attach the remotely-operated storage and deployment system 10 to varying types of vehicles or structures.

Attachment brackets 18a and detachment members 18c provide a structural fused link that protects carrier 14 from damage while in a lowered position. The structural fused link is designed to fail if carrier 14 is loaded by contact with hazards on the ground surface 16. If carrier 14 is lowered and the vehicle operator moves the vehicle 10, an unacceptable load can be introduced into carrier 14 which may damage carrier 14 and frame structure 18 to a degree that would prevent operation. The structural fused link is designed to prevent such damage. The structural fused link is configured to automatically detach from the vehicle 12 to which it is attached at a load above which the carrier 14 would be damaged. The frame structure 18 further comprises opposed frame members 18d attached to the opposed frame members 18b, and opposed frame members 18e attached to the opposed frame members 18d and to a top wall 14b of the carrier 14. In such manner, the top wall 14b of the carrier 14 is fixedly held in place relative to the opposed frame members 18e.

The carrier 14 comprises opposed top and bottom walls 14b and 14c, opposed side walls 14d and 14e, and a back wall 14f which is opposed to the ramp 14a which acts as the front wall of the carrier 14 when the ramp 14a is in the closed position. The bottom wall 14c of the carrier 14 comprises a pivotal portion attached to the ramp 14a but in other embodiments may comprise a portion of the ramp 14a. The bottom wall 14c and the attached ramp 14a are pivotally attached to the carrier 14 to move from the closed position of FIGS. 1-3 to the incrementally opened positions of FIGS. 7 and 8. In other embodiments, the ramp 14a may be attached to the carrier 14 using varying mechanisms.

Figure 4:
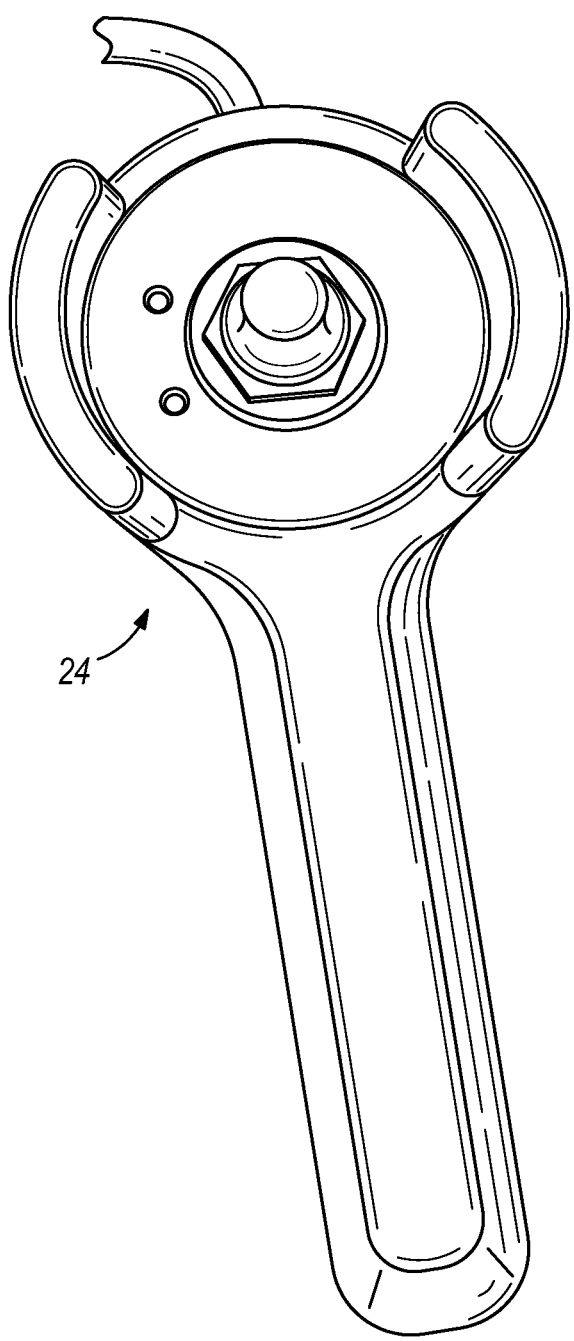
FIG. 4 illustrates a top view of one embodiment of a remote-control for remotely controlling the remotely-operated storage and deployment system of the embodiment of FIG. 1.

The motor 22 is attached to the top wall 14b of the carrier 14. The lifting device 20 is connected to the ramp 14a of the carrier 14 and to the frame structure 18 for moving a portion of the carrier 14 between the raised position of FIGS. 1-3, in which a portion of the carrier 14 is raised relative to the ground surface 16 and the ramp 14a is in the closed position enclosing the robotic vehicle (hidden from view) in the carrier 14, and the incrementally lowered positions of FIGS. 5-8 until a portion of the carrier 14 is in the lowered position of FIG. 8 with the ramp 14a in the open position allowing the robotic vehicle 26 to drive into or out of the carrier 14. FIG. 4 illustrates a top view of one embodiment of a remote-control 24 for remotely controlling the storage and deployment system 10 of FIG. 1, which may be used to remotely control the motor 22 to control movement of the carrier 14.

Figure 5:
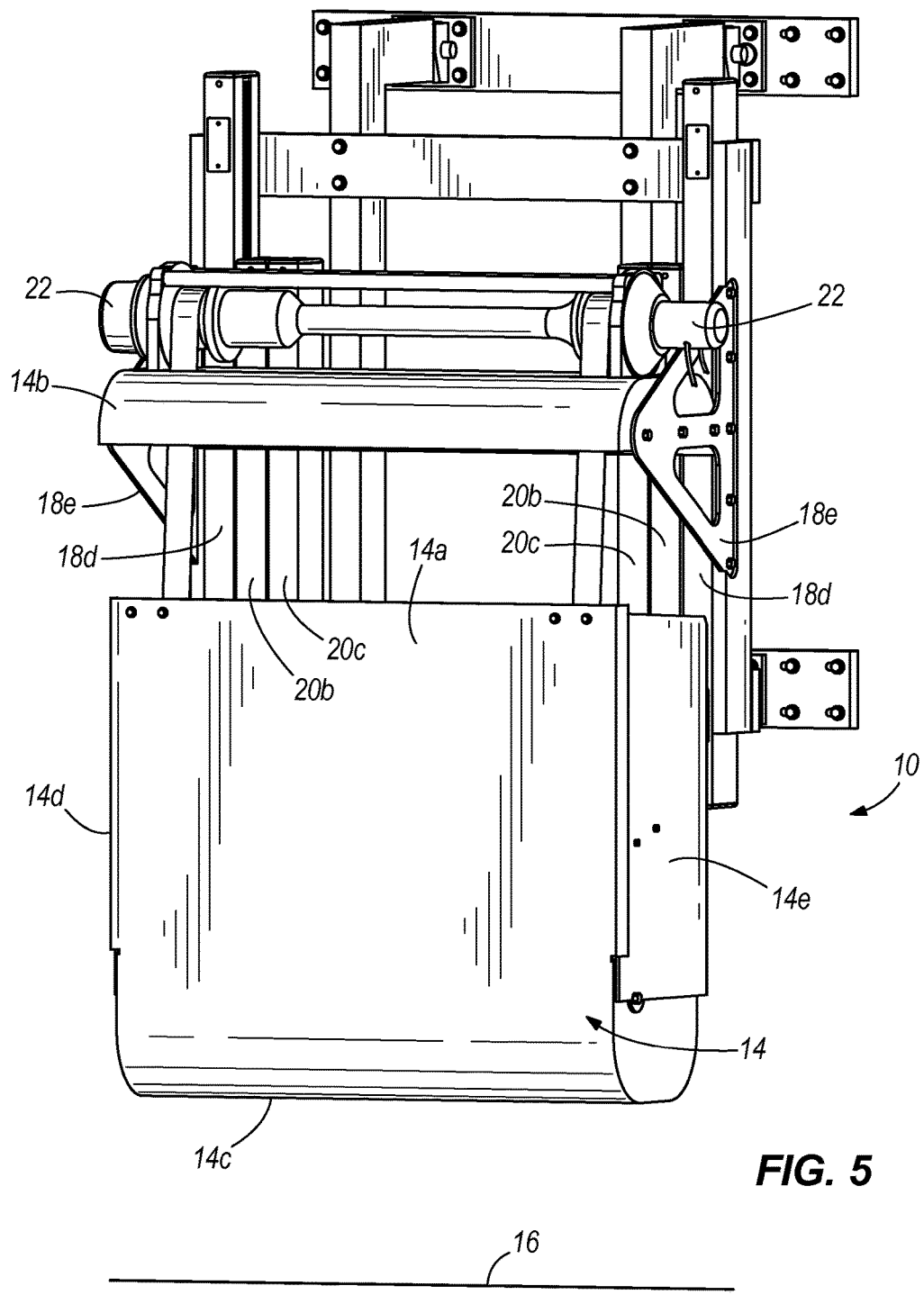
FIG. 5 illustrates a front view of the carrier of the remotely-operated storage and deployment system of the embodiment of FIG. 1 lowered slightly towards the ground surface from its raised position of FIG. 1 with the ramp still in its closed position holding the robotic vehicle (hidden from view) within the carrier.
Figure 6:
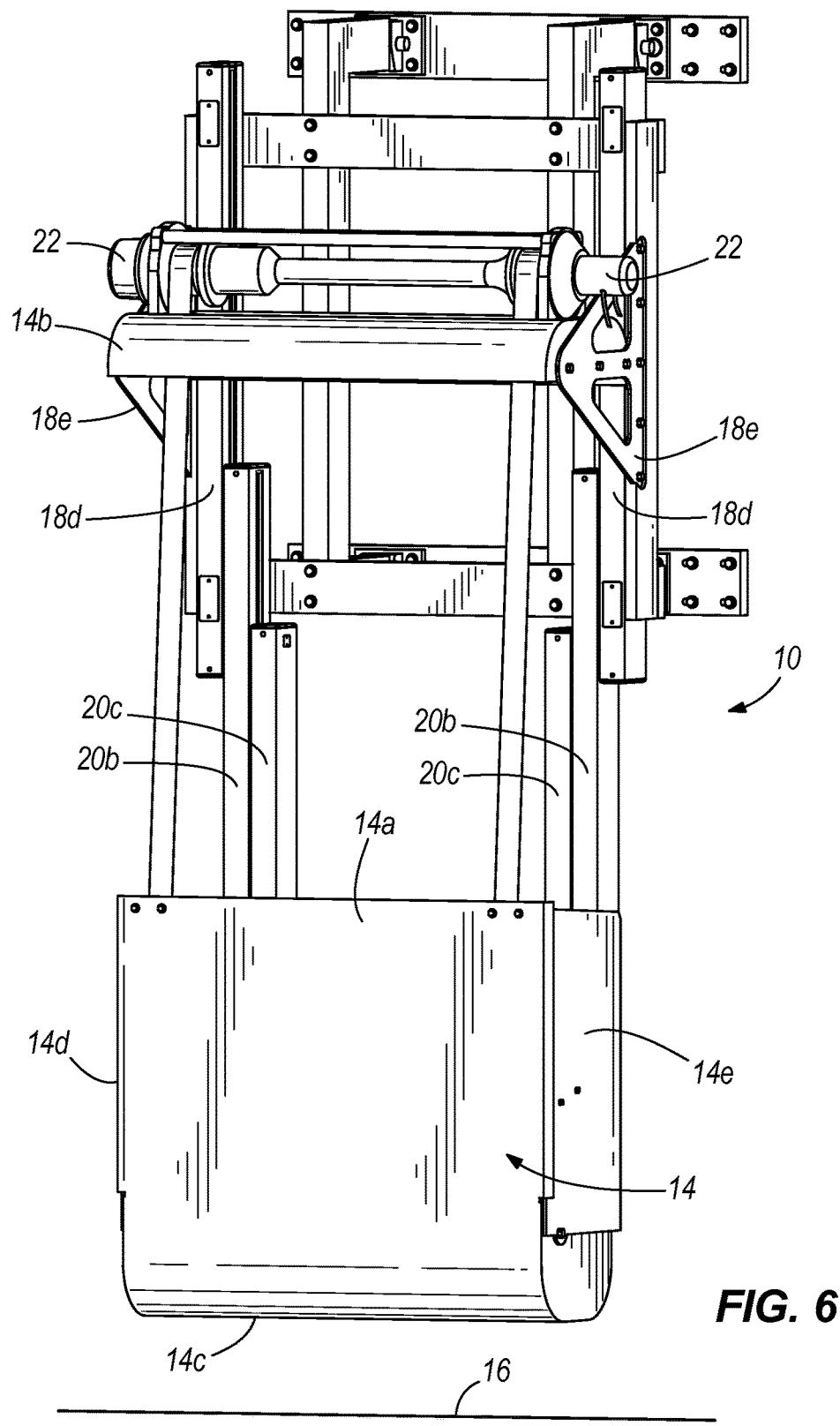
FIG. 6 illustrates a front view of the carrier of the remotely-operated storage and deployment system of the embodiment of FIG. 5 lowered more towards the ground surface from its position of FIG. 5 with the ramp still in its closed position holding the robotic vehicle (hidden from view) within the carrier.
Figure 7:
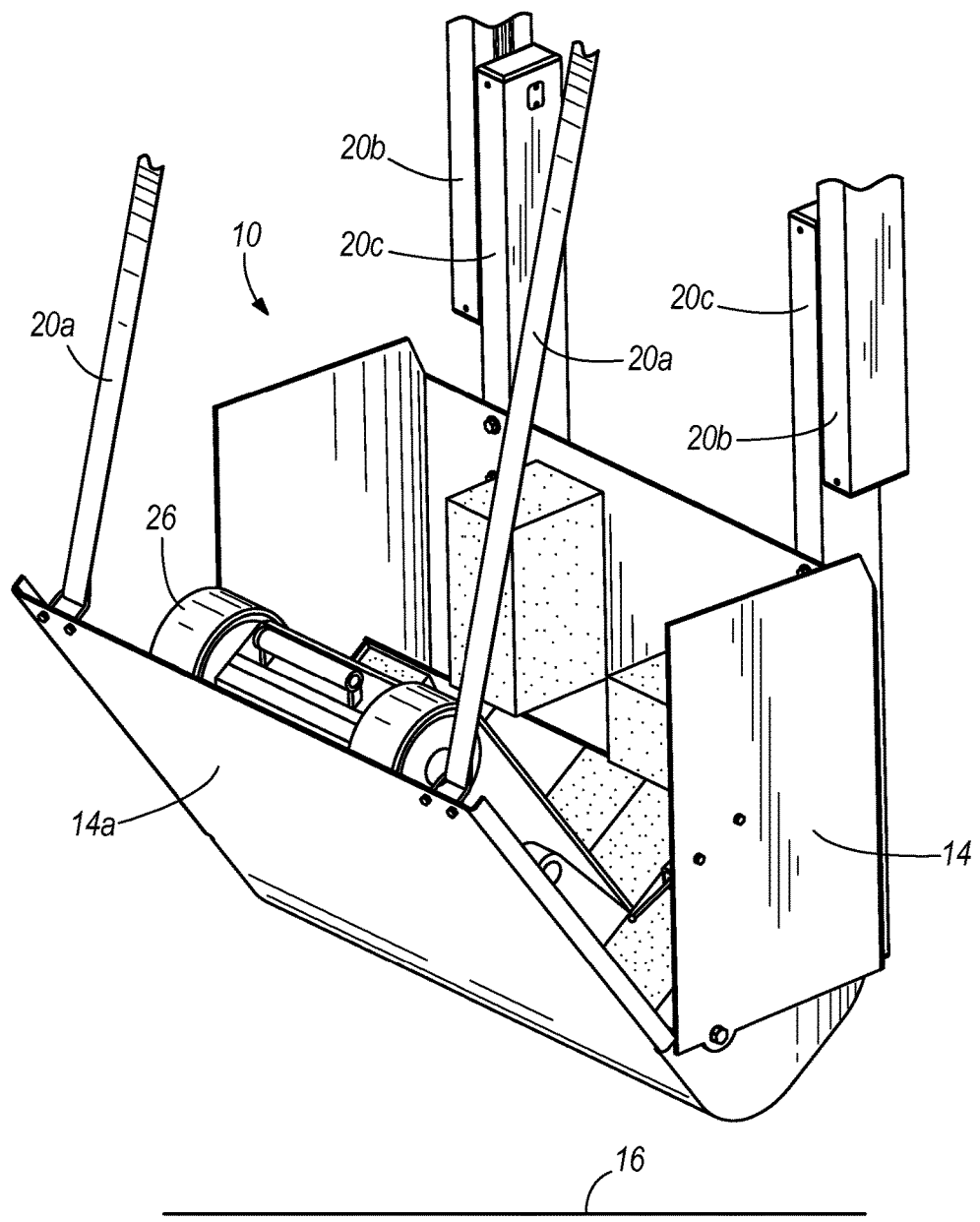
FIG. 7 illustrates a right-side view of the carrier of the remotely-operated storage and deployment system of the embodiment of FIG. 6 lowered even more towards the ground surface from its position of FIG. 6 with the ramp beginning to open to expose the robotic vehicle contained within the carrier.
Figure 8:
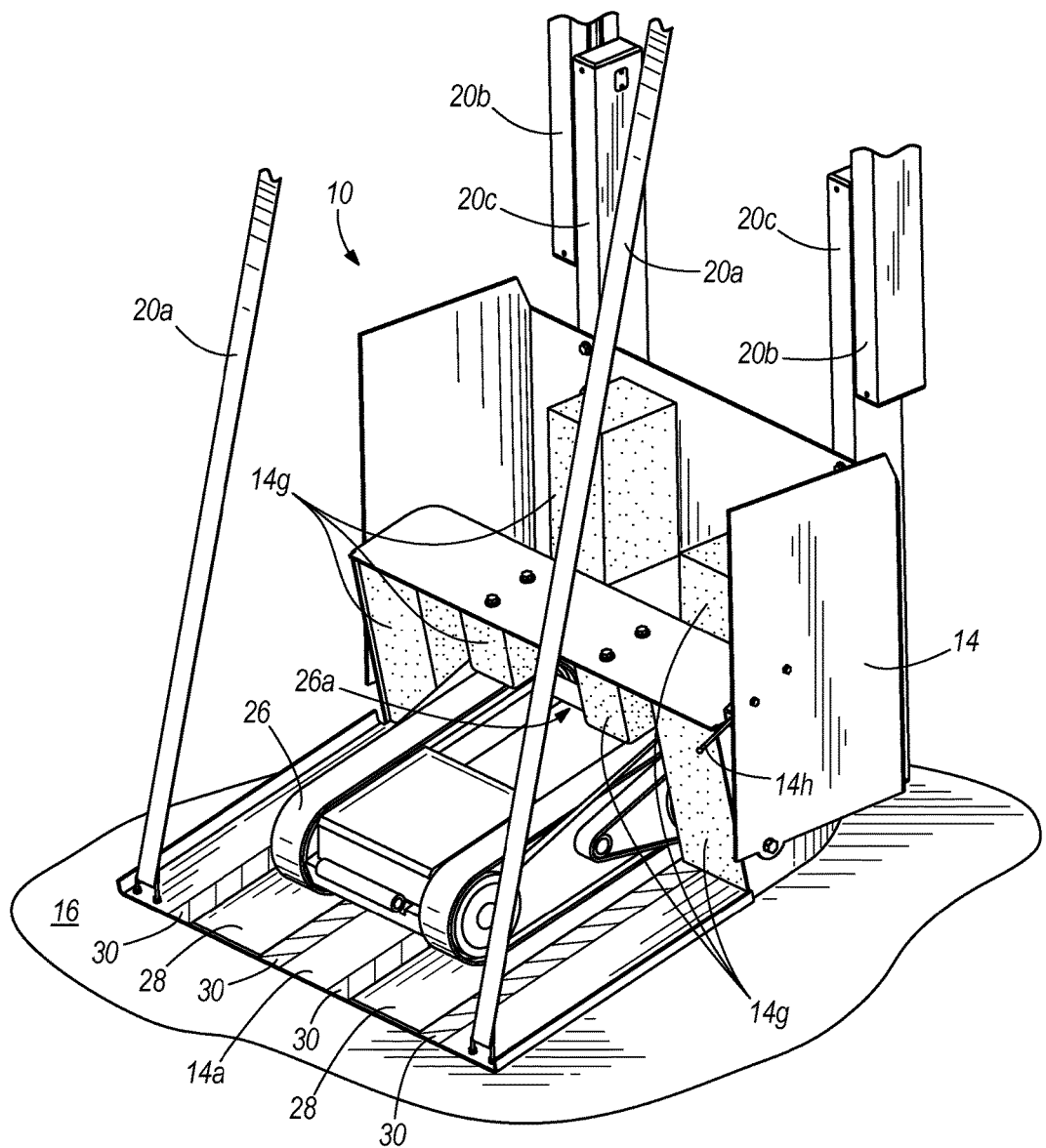
FIG. 8 illustrates a right-side view of the carrier of the remotely-operated storage and deployment system of the embodiment of FIG. 7 lowered to its lowered position relative to the ground surface with the ramp in an open position allowing the robotic vehicle to drive out of the carrier onto the ground surface.
Figure 9:
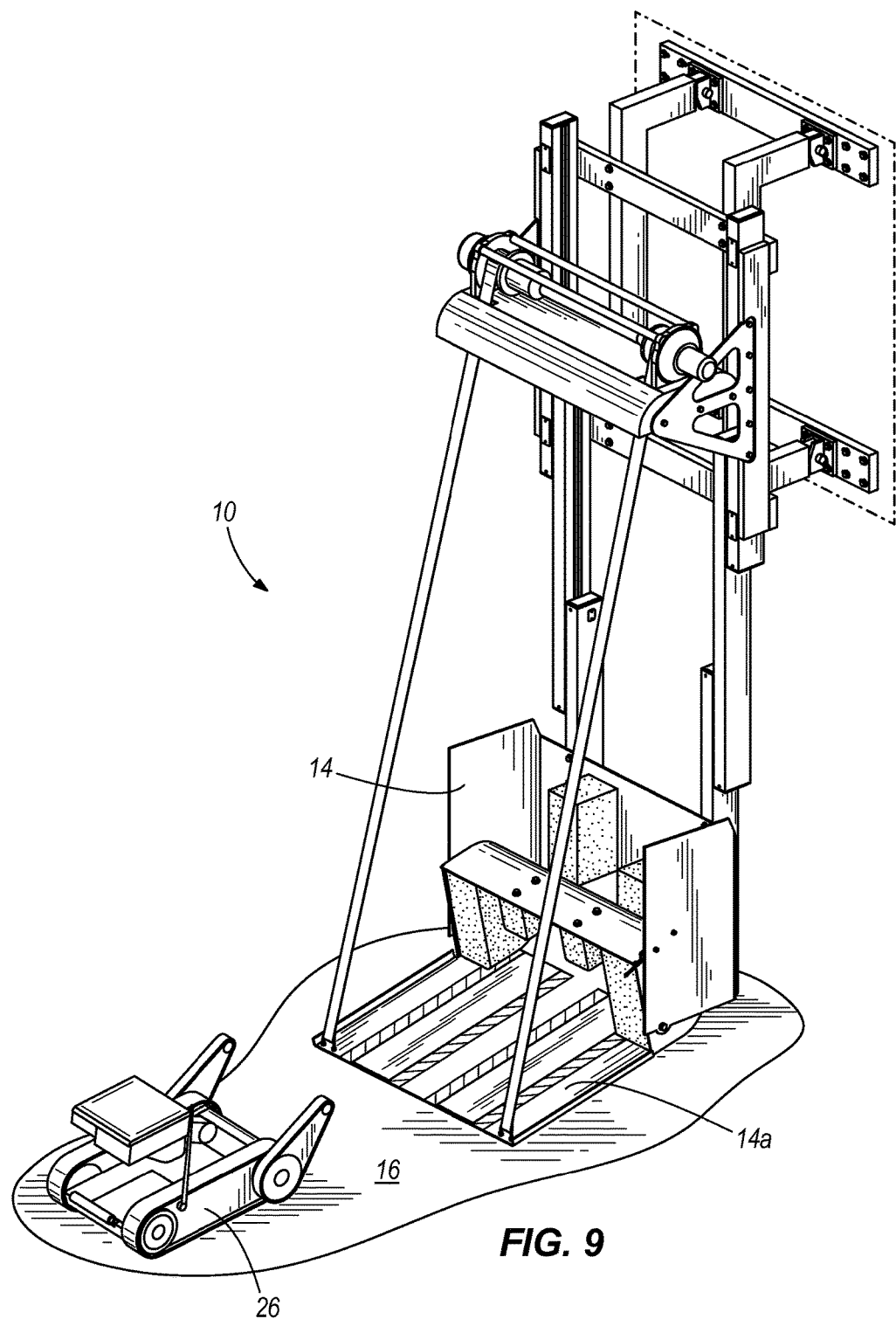
FIG. 9 illustrates a right-side view of the carrier of the remotely-operated storage and deployment system of the embodiment of FIG. 8 with the robotic vehicle having driven over the ramp and out of the carrier onto the ground surface.

FIG. 5 illustrates a front view of the carrier 14 of the storage and deployment system 10 of FIG. 1 lowered slightly towards the ground surface 16 from its raised position of FIG. 1 with the ramp 14a still in its closed position holding the robotic vehicle (hidden from view) within the carrier 14. FIG. 6 illustrates a front view of the carrier 14 of the storage and deployment system 10 of FIG. 5 lowered more towards the ground surface 16 from its position of FIG. 5 with the ramp 14a still in its closed position holding the robotic vehicle (hidden from view) within the carrier 14. FIG. 7 illustrates a right-side view of the carrier 14 of the storage and deployment system 10 of FIG. 6 lowered even more towards the ground surface 16 from its position of FIG. 6 with the ramp 14a beginning to open to expose the robotic vehicle 26 contained within the carrier 14. FIG. 8 illustrates a right-side view of the carrier 14 of the storage and deployment system 10 of FIG. 7 lowered to its lowered position (which is also its lowest position) relative to the ground surface 16 with the ramp 14a in an open position allowing the robotic vehicle 26 to drive out of the carrier 14 onto the ground surface 16. FIG. 9 illustrates a right-side view of the carrier 14 of the storage and deployment system 10 of FIG. 8 with the robotic vehicle 26 having driven over the ramp 14*a* and out of the carrier 14 onto the ground surface 16.

Figure 9A:
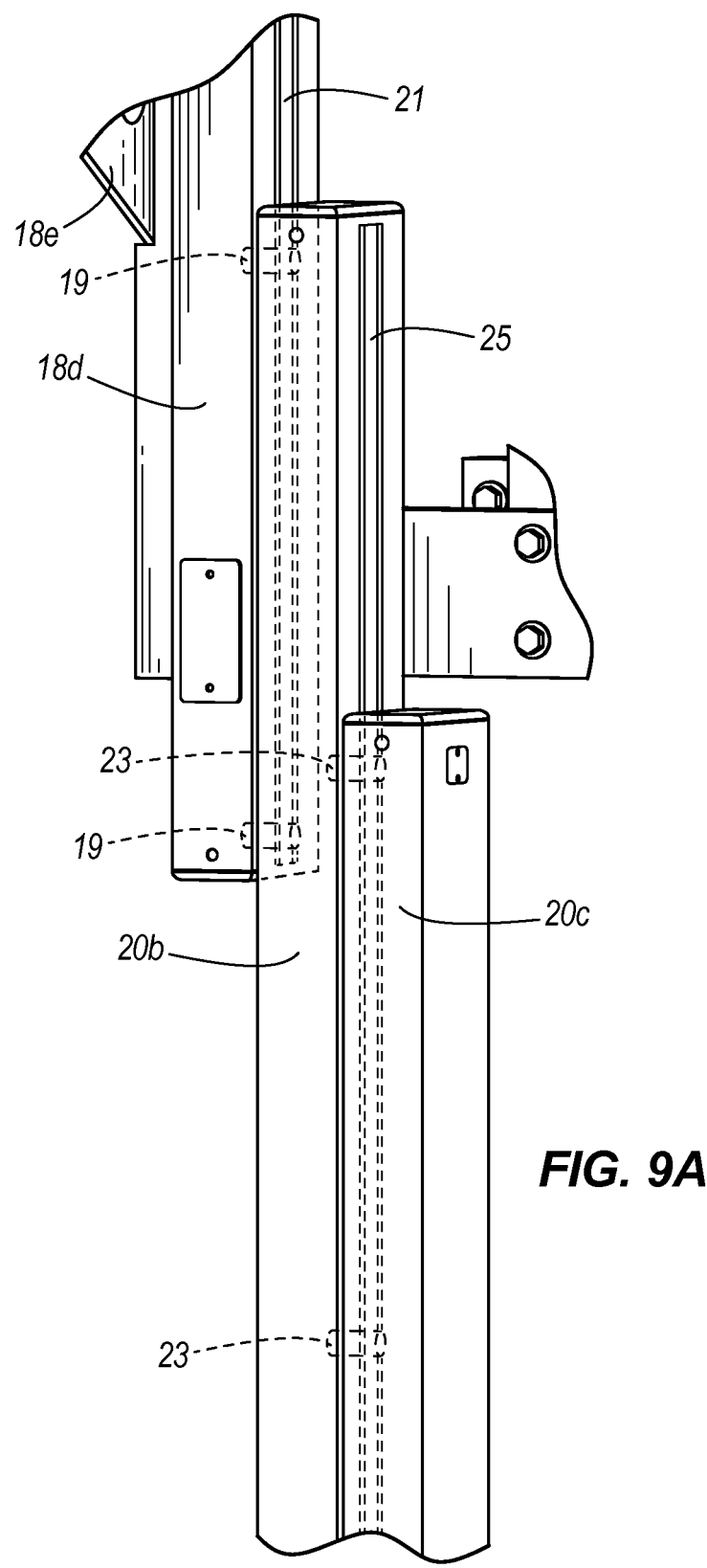
FIG. 9A illustrates moveable connections between frame members and arm members of the carrier of the embodiment of FIG. 1.

As shown collectively in FIGS. 1-3 and in FIGS. 5-9, the lifting device 20 comprises straps 20*a* attached to the motor 22, extending through holes (hidden from view) in the top wall 14*b* of the carrier 14, and attached to the ramp 14*a*. The lifting device 20 further comprises a plurality of first and second arm members 20*b* and 20*c*. FIG. 9A illustrates moveable connections between frame members and arm members of the carrier of the embodiment of FIG. 1. As shown in FIG. 9A, the first opposed arm members 20*b* are moveably attached to the opposed frame members 18*d* with pins 19 of the first opposed arm members 20*b* extending into vertical channels 21 of the opposed frame members 18*d* allowing the first opposed arm members 20*b* to move vertically up and down relative to the opposed frame members 18*d*. Further, as shown in FIG. 9A, the second opposed arm members 20*c* are moveably attached to the first opposed arm members 20*b* with pins 23 of the second opposed arm members 20*c* extending into vertical channels 25 of the first opposed arm members 20*b* allowing the second opposed arm members 20*c* to move vertically up and down relative to the first opposed arm members 20*b*. As shown collectively in FIGS. 1-3 and in FIGS. 5-9, the second opposed arm members 20*c* are fixedly attached to the back wall 14*f* of the carrier 14. In other embodiments, the lifting device 20 can comprise a varying number of straps, cables, chains, arm members, or other lifting mechanisms.

As shown incrementally in FIGS. 1, 5, and 6, as the motor 22 lowers the straps 20*a* towards the ground surface 16, the ramp 14*a* initially stays in its closed position due to the weight of the carrier 14 while the first and second opposed arm members 20*b* and 20*c* move relative to one another and relative to the opposed frame members 18*d* towards the ground surface 16 and away from the opposed frame member 18*d* in order to lower the bottom wall 14*c*, opposed side walls 14*d* and 14*e*, back wall 14*f*, and ramp 14*a* of the carrier 14 towards the ground surface 16 and away from the top wall 14*b* of the carrier 14 which remains fixed in place due to its attachment to the opposed frame members 18*e*.

As shown incrementally in FIGS. 7 and 8, once the first and second opposed arm members 20*b* and 20*c* reach their fully extended downward position (i.e. when at least one of their respective pins 19 and 23 reach the bottom of the channels 21 and 25 in the members 18*d* and 20*b* in which they are disposed as shown in FIG. 9A), the ramp 14*a* then begins to pivot open as the motor 22 (hidden from view) continues to lower the straps 20*a* as shown in FIG. 7. The ramp 14*a* fully rotates when it reaches its open position as shown in FIG. 8. At this point, as shown in FIG. 9, the robotic vehicle 26 drives onto the ground surface 16 to achieve its task. After the robotic vehicle 26 achieves its task, which may be military department related, police department related, fire department related, or another type of task, the robotic vehicle 26 may then be driven back onto the ramp 14*a* as shown in FIG. 8, the ramp 14*a* may then begin to close as shown in FIG. 7, and then the carrier 14 may be raised to its raised position with the ramp 14*a* moving to its closed position to store the robotic vehicle 26 within the carrier 14 as shown incrementally in FIGS. 6, 5, and 1.

The entire process may be done remotely by an operator located within the vehicle 12, or in another remote location, using the remote-control 24 of FIG. 4, or one or more additional remote-controls, to lower the carrier 14, to open the ramp 14*a*, to drive the robotic vehicle 26 off the ramp 14*a* onto the ground surface 16 to accomplish its mission, to drive the robotic vehicle 26 back onto the ramp 14 from the ground surface 16, to raise the carrier 14 back to its raised position, and to close the ramp 14*a* back into its closed position to secure the robotic vehicle 26 within the carrier 14.

As shown in FIG. 8, the ramp 14*a* includes tracks 28 made of grip material for providing traction for the robotic vehicle 26. The ramp 14*a* further comprises visual markers 30 for assisting the robotic vehicle 26 to drive off of or onto the ramp 14*a* in a proper orientation using a remotely-operated device 26*a* of the robotic vehicle 26 such as a camera or other type of sensor. The ramp 14*a* is sized to hold the robotic vehicle 26 as it exits or drives onto the ramp 14*a*. The carrier 14, including the ramp 14*a*, further include anti-vibration material 14*g* which compresses against the robotic vehicle 26 to reduce vibration of the robotic vehicle 26 while it is enclosed in the carrier 14. The anti-vibration material 14*g* may comprise a foam, such as Styrofoam, or another type of anti-vibration material. The carrier 14 further comprises a spring 14*h* which biases the ramp 14*a* towards its open position to force the ramp 14*a* into the open position once the first and second opposed arm members 20*b* and 20*c* reach their fully extended downward position (i.e. when at least one of their respective pins 19 and 23 reach the bottom of the channels 21 and 25 in the members 18*d* and 20*b* in which they are disposed as shown in FIG. 9A). The securing or recovery process of the robotic vehicle 26 is done automatically without operator intervention.

Figure 10:
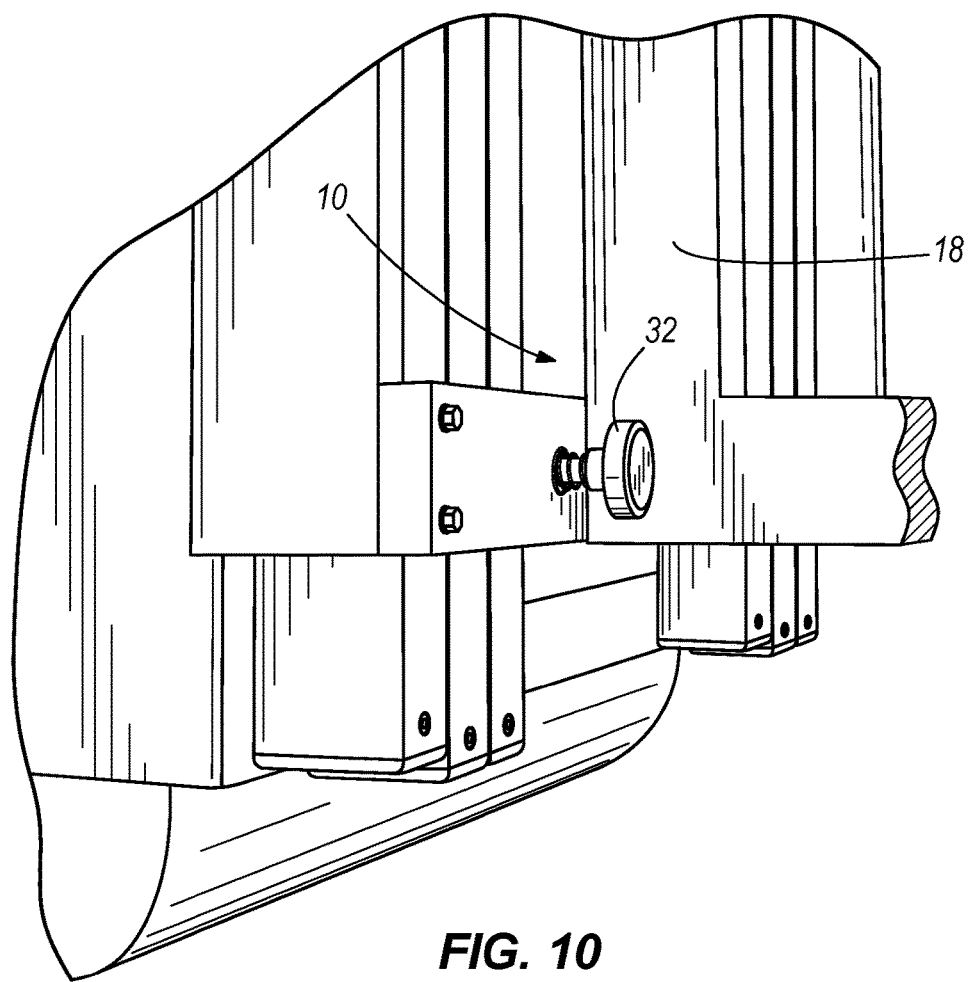
FIG. 10 illustrates a right-side view of a portion of the frame structure of the remotely-operated storage and deployment system of the embodiment of FIG. 1 showing a control member which may be used to control movement of the carrier to an interim position.
Figure 11:
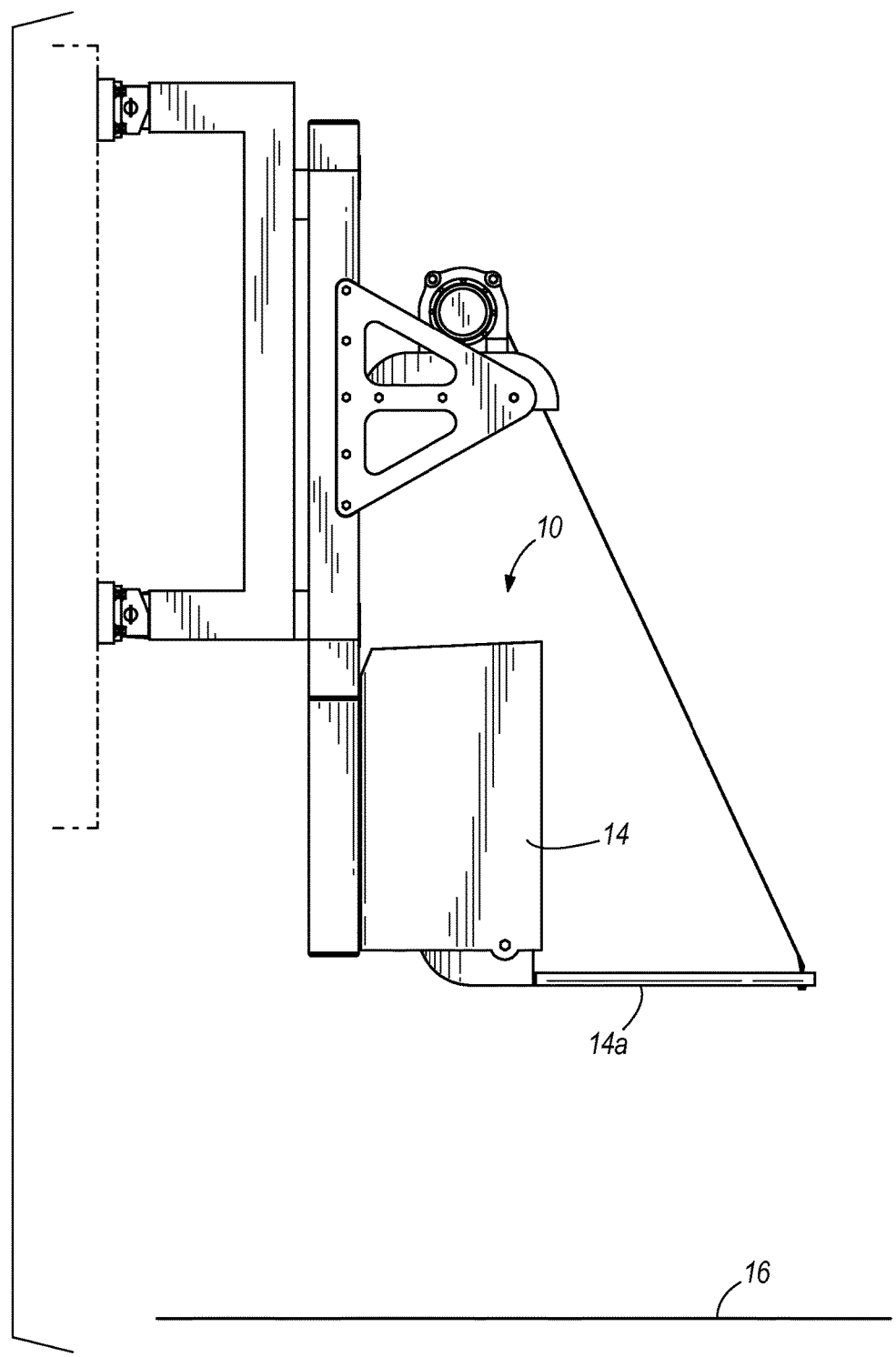
FIG. 11 illustrates a left-side view of the remotely-operated storage and deployment system of the embodiment of FIG. 1 with the carrier moved to the interim position, due to the control member of FIG. 10 having been moved, in-between the raised position of FIG. 1 and the lowered position of FIG. 8 with the ramp having moved to a horizontal position.

FIG. 10 illustrates a right-side view of a portion of the frame structure 18 of the storage and deployment system 10 of FIG. 1 showing a control member 32 which may be used to control movement of the carrier 14 (hidden from view) to an interim position. The control member 32 may comprise a knob or other control member which when pulled, depressed, or otherwise moved causes the carrier 14 (hidden from view) to move to an interim position. FIG. 11 illustrates a left-side view of the storage and deployment system 10 of FIG. 1 with the carrier 14 moved to the interim position, due to the control member 32 of FIG. 10 having been moved, in-between the raised position of FIG. 1 and the lowered position of FIG. 8 with the ramp 14*a* having moved to a horizontal position. This allows for interaction with a work or service platform, or it allows the operator to grab and run with the robotic vehicle 26 rather than lowering the robotic vehicle 26 to the ground surface 16 saving time retrieving the robotic vehicle 26 from the carrier 14.

Figure 12:
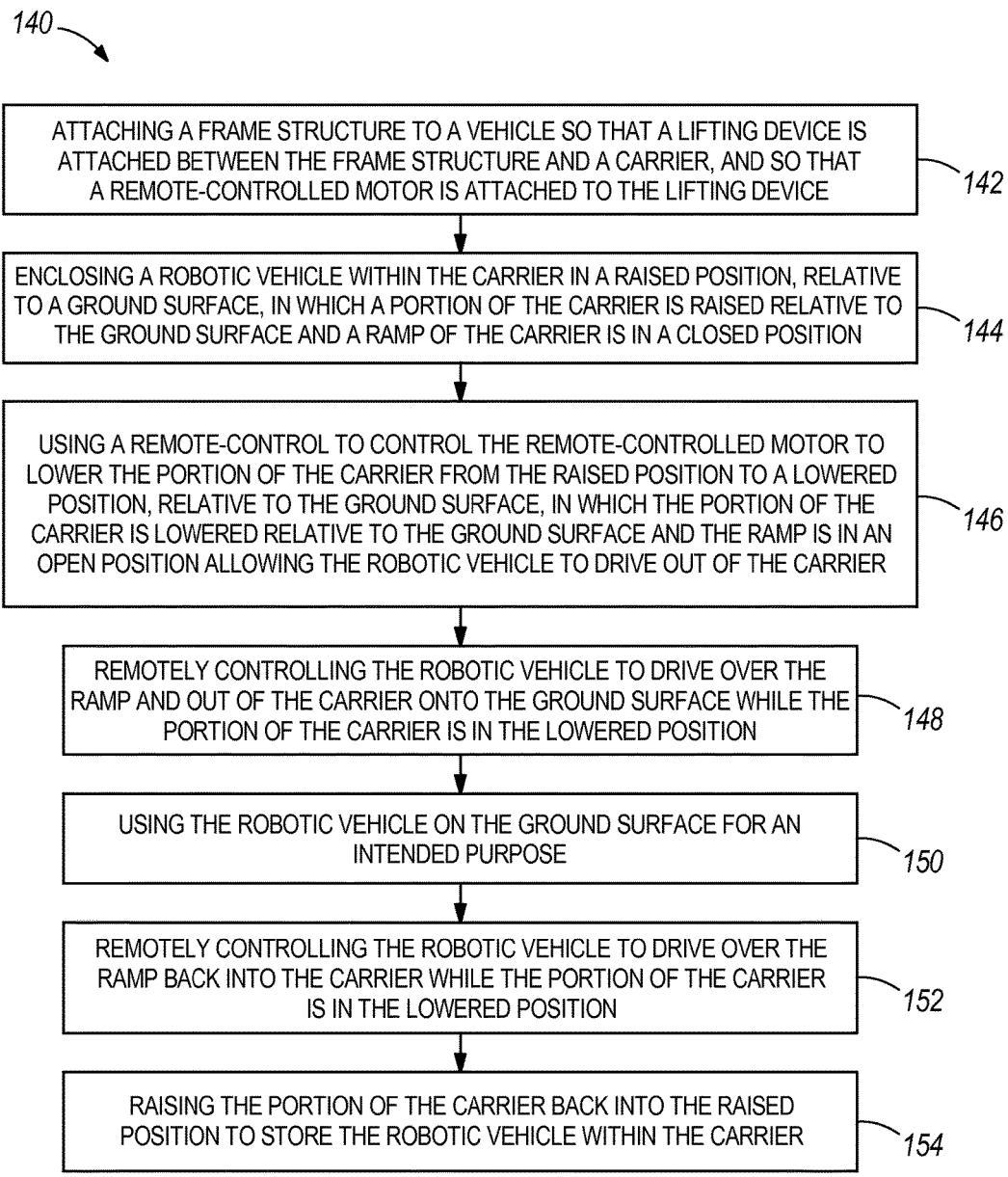
FIG. 12 illustrates a flowchart of one embodiment of a method of deploying a robotic vehicle which may be done remotely with a remotely located operator.

FIG. 12 is a flowchart illustrating one embodiment of a method 140 of deploying a robotic vehicle which may be done remotely with a remotely located operator. The method 140 may utilize any of the embodiments of the remotely-operated storage and deployment system described in this disclosure. In step 142, a frame structure is attached to a vehicle so that a lifting device is attached between the frame structure and a carrier, and so that a remote-controlled motor is attached to the lifting device. In step 144, a robotic vehicle is enclosed within a carrier in a raised position, relative to a ground surface, in which a portion of the carrier is raised relative to a ground surface and a ramp of the carrier is in a closed position preventing the robotic vehicle from coming out of the carrier. Step 144 may further comprise compressing anti-vibration material of the carrier against the robotic vehicle to reduce vibration of the robotic vehicle.

In step 146, the portion of the carrier is lowered, using a remote-control to control the remote-controlled motor attached to the lifting device, from the raised position to a lowered position, relative to the ground surface, in which the portion of the carrier is lowered relative to the ground surface and the ramp is in an open position allowing the robotic vehicle to drive out of the carrier. In step 148, the robotic vehicle is remotely controlled to drive over the ramp and out of the carrier onto the ground surface while the portion of the carrier is in the lowered position. Step 148 may further comprise viewing, with the robotic vehicle, at least one visual marker on the ramp in order to drive the robotic vehicle into the proper orientation over the ramp and out of the carrier. In one embodiment, the visual marker may be at the center of the ramp home position. In step 150, the robotic vehicle is used on the ground surface for an intended purpose. The intended purpose may be for a military department use, a police department use, a fire department use, or for another type of use.

In step 152, the robotic vehicle is controlled to drive over the ramp back into the carrier while the portion of the carrier is in the lowered position. Step 152 may further comprise viewing, with the robotic vehicle, at least one visual marker of the ramp in order to drive the robotic vehicle into the proper orientation over the ramp and into the carrier, and compressing anti-vibration material of the carrier against the robotic vehicle to reduce vibration of the robotic vehicle. In step 154, the portion of the carrier is raised back into the raised position to store the robotic vehicle within the carrier. In other embodiments, one or more steps of the method 140 may be modified, not followed, or changed in order, or one or more additional steps may be added.

One or more embodiments of the disclosure may reduce one or more issues of one or more of the current systems and methods for carrying, storing, deploying, and retrieving a robotic vehicle. For instance, the disclosure allows for an operator of a robotic vehicle to deploy and recover the robotic vehicle remotely, such as the operator being located inside the vehicle which carried the robotic vehicle to the deployment location or the operator being located in another remote operation location. This allows the operator to maintain a protected position when the robotic vehicle is deployed in a dangerous environment. One or more other issues associated with the current systems and methods for carrying, storing, deploying, and retrieving a robotic vehicle may also be reduced or resolved by one or more embodiments of the disclosure.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A remotely-operated storage and deployment system for a robotic vehicle comprising:
    a frame structure that includes a top wall;
    a carrier sized to hold and enclose the robotic vehicle, the carrier comprising a ramp and a bottom wall moveable between a closed position and an open position in which the robotic vehicle can drive into or out of the carrier, the carrier further comprising side walls on opposing sides of the ramp and bottom wall;
    a lifting device connected to the carrier and to the frame structure for moving at least the side walls, bottom wall, and ramp of the carrier between a raised position in which the side walls, bottom wall, and ramp of the carrier is raised relative to a ground surface and the frame structure and a lowered position in which the side walls, bottom wall, and ramp of the carrier is lowered relative to the ground surface and the frame structure, wherein the lifting device holds the ramp and bottom wall in the closed position when the carrier is not in the lowered position, wherein the lifting device enables movement of the ramp and bottom wall between the closed position and the open position when the carrier is in the lowered position for allowing the robotic vehicle to drive into or out of the carrier, and wherein the bottom wall, top wall, side walls, and ramp enclose the robotic vehicle when the carrier is in the raised position; and
    a remote-controlled motor connected to the lifting device for allowing the carrier to be moved, by a remotely-located operator, between the raised position and the lowered position.

2. The remotely-operated storage and deployment system of claim 1 wherein the frame structure comprises an attachment bracket for attaching the remotely-operated storage and deployment system to a vehicle.

3. The remotely-operated storage and deployment system of claim 2 further comprising a detachment member for detaching a portion of the frame structure from the attachment bracket.

4. The remotely-operated storage and deployment system of claim 2 wherein a portion of the frame structure is configured to automatically detach from the vehicle to which it is attached at a load above which the carrier would be damaged.

5. The remotely-operated storage and deployment system of claim 1 wherein the carrier comprises opposed bottom and top walls, opposed side walls, and a back wall, wherein the ramp comprises a front wall of the carrier and is opposed to the back wall when the ramp is in the closed position.

6. The remotely-operated storage and deployment system of claim 1 wherein the ramp is pivotally attached to the carrier to move from the closed position to the open position.

7. The remotely-operated storage and deployment system of claim 1 wherein the lifting device comprises at least one strap, cable, or chain directly connected to the ramp.

8. The remotely-operated storage and deployment system of claim 1 wherein the lifting device comprises first and second arm members which are moveably attached to one-another.

9. The remotely-operated storage and deployment system of claim 1 further comprising a spring biasing the ramp towards the open position.

10. The remotely-operated storage and deployment system of claim 1 further comprising a control member for moving the portion of the carrier to an interim position in-between the raised position and the lowered position in which the ramp is moved to a horizontal position.

11. A vehicle comprising:
a remotely-operated storage and deployment system attached to the vehicle comprising:
a frame structure attached to the vehicle that includes a top wall;
a carrier sized to hold and enclose a robotic vehicle, the carrier comprising a ramp and a bottom wall moveable between a closed position and an open position in which the robotically-operated vehicle can move into or out of the carrier, the carrier further comprising side walls on opposing sides of the ramp and bottom wall;
a lifting device connected to the carrier and to the frame structure, wherein operation of the lifting device in a first direction moves at least the side walls, bottom wall, and ramp of the carrier from a raised position in which at least the side walls, bottom wall, and ramp of the carrier is raised relative to a ground surface and the frame structure to a lowered position in which at least the side walls, bottom wall, and ramp of the carrier is lowered relative to the ground surface and the frame structure and then enables the ramp and the bottom wall to move from the closed position to the open position for allowing the robotic vehicle to drive into or out of the carrier, and wherein operation of the lifting device in a second direction moves the ramp and the bottom wall from the open position to the closed position and then moves at least the side walls, bottom wall, and ramp of the carrier from the lowered position to the raised position; and
a remote-controlled motor connected to the lifting device for allowing the carrier to be moved, by a remotely-located operator, between the raised position and the lowered position.

12. The vehicle of claim 11 further comprising the robotic vehicle.

13. The vehicle of claim 12 wherein the robotic vehicle is a military department robotic vehicle, a police department robotic vehicle, or a fire department robotic vehicle.

14. The vehicle of claim 11 wherein the vehicle comprises a military department vehicle, a police department vehicle, or a fire department vehicle.

15. The vehicle of claim 11, wherein the remotely-operated storage and deployment system is attached to an exterior of the vehicle.

16. A man-operated vehicle comprising an automated system for remotely carrying, deploying, and retrieving a robotically-operated vehicle, the man-operated vehicle comprising:
a frame structure that includes a top wall;
a carrier sized to hold and enclose the robotically-operated vehicle, the carrier comprising a ramp and a bottom wall moveable between a closed position and an open position in which the robotically-operated vehicle can move into or out of the carrier, the carrier further comprising side walls on opposing sides of the ramp and bottom wall;
a lifting device connected to the carrier and to the frame structure for moving at least the side walls, bottom wall, and ramp of the carrier between a raised position in which the side walls, bottom wall, and ramp of the carrier is raised relative to a ground surface and the frame structure and a lowered position in which the side walls, bottom wall, and ramp of the carrier is lowered relative to the ground and the frame structure, wherein the lifting device holds the ramp and bottom wall in the closed position when the carrier is not in the lowered position, wherein the lifting device enables movement of the ramp and the bottom wall between the closed position and the open position when the carrier is in the lowered position for allowing the robotic vehicle to drive into or out of the carrier, and wherein the bottom wall, top wall, side walls, and ramp enclose the robotic vehicle when the carrier is in the raised position; and
a remote-controlled motor connected to the lifting device for allowing the carrier to be moved, by a remotely-located operator, between the raised position and the lowered position.

* * * * *